United States Patent
Kubota et al.

(10) Patent No.: US 12,000,472 B2
(45) Date of Patent: Jun. 4, 2024

(54) SPROCKET

(71) Applicants: Sunstar Engineering Inc., Osaka (JP); YAMAHA HATSUDOKI KABUSHIKI KAISHA, Shizuoka (JP)

(72) Inventors: Satoshi Kubota, Osaka (JP); Yuya Okuda, Shizuoka (JP)

(73) Assignees: Sunstar Engineering Inc., Osaka (JP); YAMAHA HATSUDOKI KABUSHIKI KAISHA, Shizuoka (JP)

( * ) Notice: Subject to any disclaimer, the term of this patent is extended or adjusted under 35 U.S.C. 154(b) by 1 day.

(21) Appl. No.: 17/997,366

(22) PCT Filed: Mar. 22, 2021

(86) PCT No.: PCT/JP2021/011629
§ 371 (c)(1),
(2) Date: Oct. 27, 2022

(87) PCT Pub. No.: WO2021/220664
PCT Pub. Date: Nov. 4, 2021

(65) Prior Publication Data
US 2023/0204090 A1    Jun. 29, 2023

(30) Foreign Application Priority Data
May 1, 2020 (JP) ................. 2020-081000

(51) Int. Cl.
*F16H 55/30* (2006.01)
(52) U.S. Cl.
CPC .................... *F16H 55/30* (2013.01)
(58) Field of Classification Search
CPC .......... F16H 55/30; F16H 55/06; F16H 55/12; B62M 9/10
(Continued)

(56) References Cited

U.S. PATENT DOCUMENTS 5,782,712 A * 7/1998 Campagnolo ........... F16H 55/08
474/160
9,085,846 B2 * 7/2015 Garlatti .................. F16H 55/48
(Continued)

FOREIGN PATENT DOCUMENTS

CN  201434059 Y   3/2010
CN  201989918 U * 9/2011
(Continued)

OTHER PUBLICATIONS

PCT International Search Report for related International Application No. PCT/JP2021/011629 dated May 13, 2021 and its English Translation.
(Continued)

*Primary Examiner* — Gene O Crawford
*Assistant Examiner* — Emily R Kincaid
(74) *Attorney, Agent, or Firm* — Renner, Otto, Boisselle & Sklar, LLP

(57) ABSTRACT

Provided is a strong and lightweight sprocket. A sprocket according to one aspect of the present invention comprises: attachment holes 20 formed at equal intervals in the circumferential direction; a plurality of sprocket teeth 30 provided to the outer periphery; first openings 40 formed into substantially triangular shapes of which two corners each face an attachment hole 20 and the remaining corner is positioned toward the outer periphery; and second openings 50 that are formed into substantially triangular shapes of which one corner faces an attachment hole 20 and the remaining two corners are positioned toward the outer periphery, and that, with the first openings 40, demarcate first crossbars 70 with which driving force and load reaction force align and second crossbars 80 with which driving force and load reaction force conflict.

3 Claims, 3 Drawing Sheets

(58) Field of Classification Search
USPC .......................................................... 474/152
See application file for complete search history.

(56) References Cited

U.S. PATENT DOCUMENTS

| | | | | |
|---|---|---|---|---|
| 2011/0312457 | A1* | 12/2011 | Wang | F16H 55/30 |
| | | | | 474/152 |
| 2013/0116074 | A1* | 5/2013 | Lin | B62M 9/00 |
| | | | | 474/152 |
| 2013/0143704 | A1* | 6/2013 | Blank | B62M 9/10 |
| | | | | 474/152 |
| 2016/0215866 | A1 | 7/2016 | Stefan et al. | |

FOREIGN PATENT DOCUMENTS

| | | | |
|---|---|---|---|
| DE | 102010023881 | A1 | 11/2011 |
| DE | 102013011355 | A1 | 1/2015 |
| JP | 3224267 | U | 11/2019 |

OTHER PUBLICATIONS

Extended European Search Report for corresponding European Application No. 21797042.5 mailed Feb. 21, 2024.

* cited by examiner

SPROCKET

This application is a national phase of International Application No. PCT/JP2021/011629 filed 22 Mar. 2021, which claims priority to Japan Application No. 2020-081000 filed May 1, 2020, the entireties of which are hereby incorporated by reference.

TECHNICAL FIELD

The present invention relates to a sprocket.

BACKGROUND ART

For example, a mechanism for transmitting a rotational force (a driving force or a braking force) by means of a chain and a sprocket is widely used in motorcycles and the like. It is desirable for the sprocket to satisfy contradictory requirements: to be strong and lightweight. To satisfy the requirements, Patent Document 1 discloses that openings for weight reduction are formed in a sprocket to such an extent that the strength of the sprocket is not impaired.

Patent Document 1: Japanese Utility Model Publication No. 3224267

DISCLOSURE OF THE INVENTION

Problems to be Solved by the Invention

According to Patent Document 1, the openings have a circular shape. In this respect, it is necessary to devise shapes and arrangement of the openings in order to achieve a higher strength and further weight reduction. It is an object of the present invention to provide a sprocket having a high strength and a light weight.

Means for Solving the Problems

An aspect of the present invention is directed to a sprocket including: mounting holes arranged at equal intervals in a circumferential direction; a plurality of sprocket teeth provided on an outer periphery; first openings each having a substantially triangular shape two corners of which respectively face the mounting holes and a remaining one corner of which is located toward the outer periphery; and second openings each having a substantially triangular shape one corner of which faces the mounting hole and remaining two corners of which are located toward the outer periphery. The first and second openings define therebetween first crossbars where a driving force and a load reaction force act toward each other and second crossbars where a driving force and a load reaction force act away from each other.

In the sprocket according to the above aspect, an inclination angle at which a centerline of a minimum-width site of each first crossbar is inclined with respect to a radial direction may be smaller than an inclination angle at which a centerline of a minimum-width site of each second crossbar is inclined with respect to a radial direction.

In the sprocket according to the above aspect, a first reference line passes through a center of one of the mounting holes and is parallel to a centerline of a minimum-width site of each first crossbar, and a second reference line passes through a center of one of the mounting holes and is parallel to a centerline of a minimum-width site of each second crossbar. An intersection point of the first reference line with the second reference line may be positioned in a vicinity of an addendum circle of the sprocket teeth.

In the sprocket according to the above aspect, with respect to a center of rotation as a reference, an angle is formed by the intersection point and one of the mounting holes that is adjacent to the first crossbar, and an angle is formed between adjacent two of the mounting holes. A ratio of the former angle to the latter angle may be 0.20 or more and 0.45 or less.

In the sprocket according to the above aspect, a minimum width of each first crossbar may be larger than a minimum width of each second crossbar.

In the sprocket according to the above aspect, for a minimum-width site of each first crossbar, a tangent line to a side edge adjacent to the first opening may pass through a location toward a center of rotation relative to one of the mounting holes, and a tangent line to a side edge adjacent to the second opening may pass through a location toward the outer periphery relative to the one of the mounting holes. For a minimum-width site of each second crossbar, a tangent line to a side edge adjacent to the first opening may pass through one of the mounting holes, and a tangent line to a side edge adjacent to the second opening may pass through a location toward the outer periphery relative to the one of the mounting holes.

Effects of the Invention

The sprocket of the present invention has a high strength and a light weight.

PREFERRED MODE FOR CARRYING OUT THE INVENTION

Figure 1:
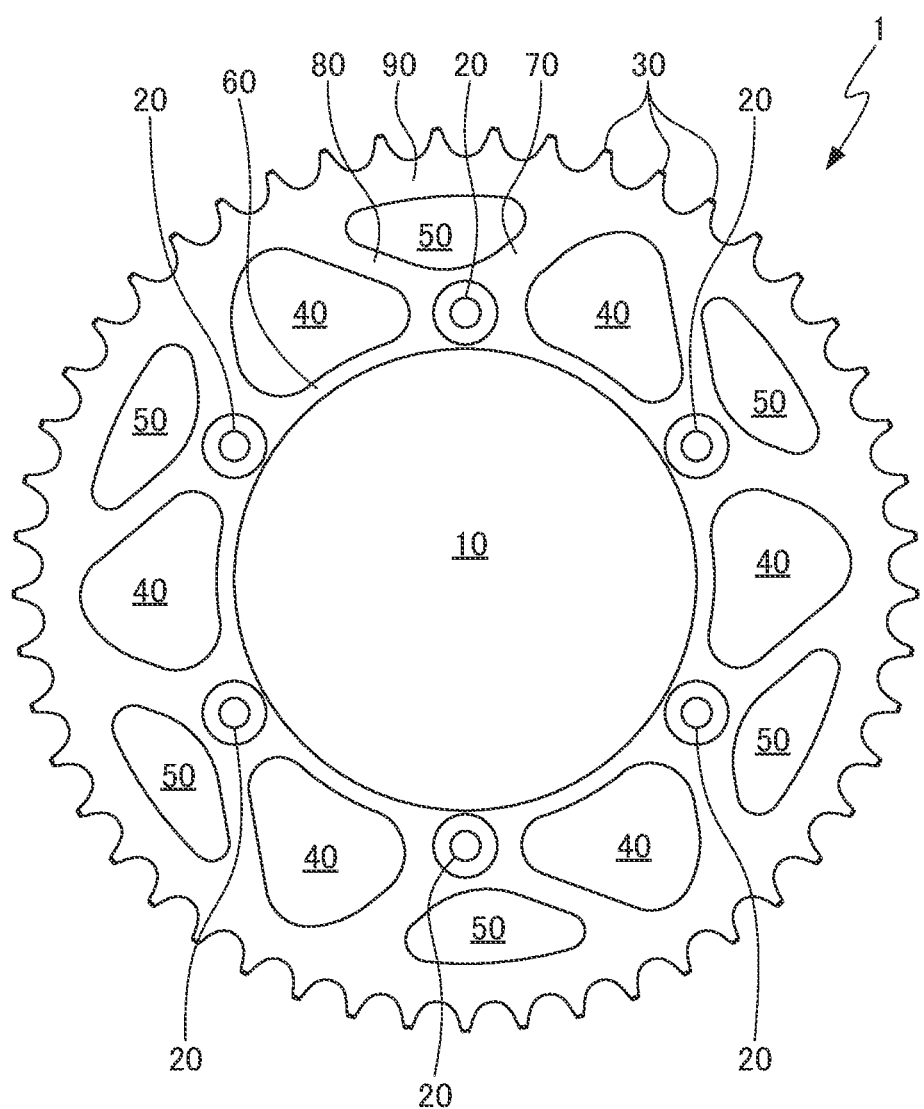
FIG. 1 is a planar view of a sprocket according to an embodiment of the present invention.
Figure 2:
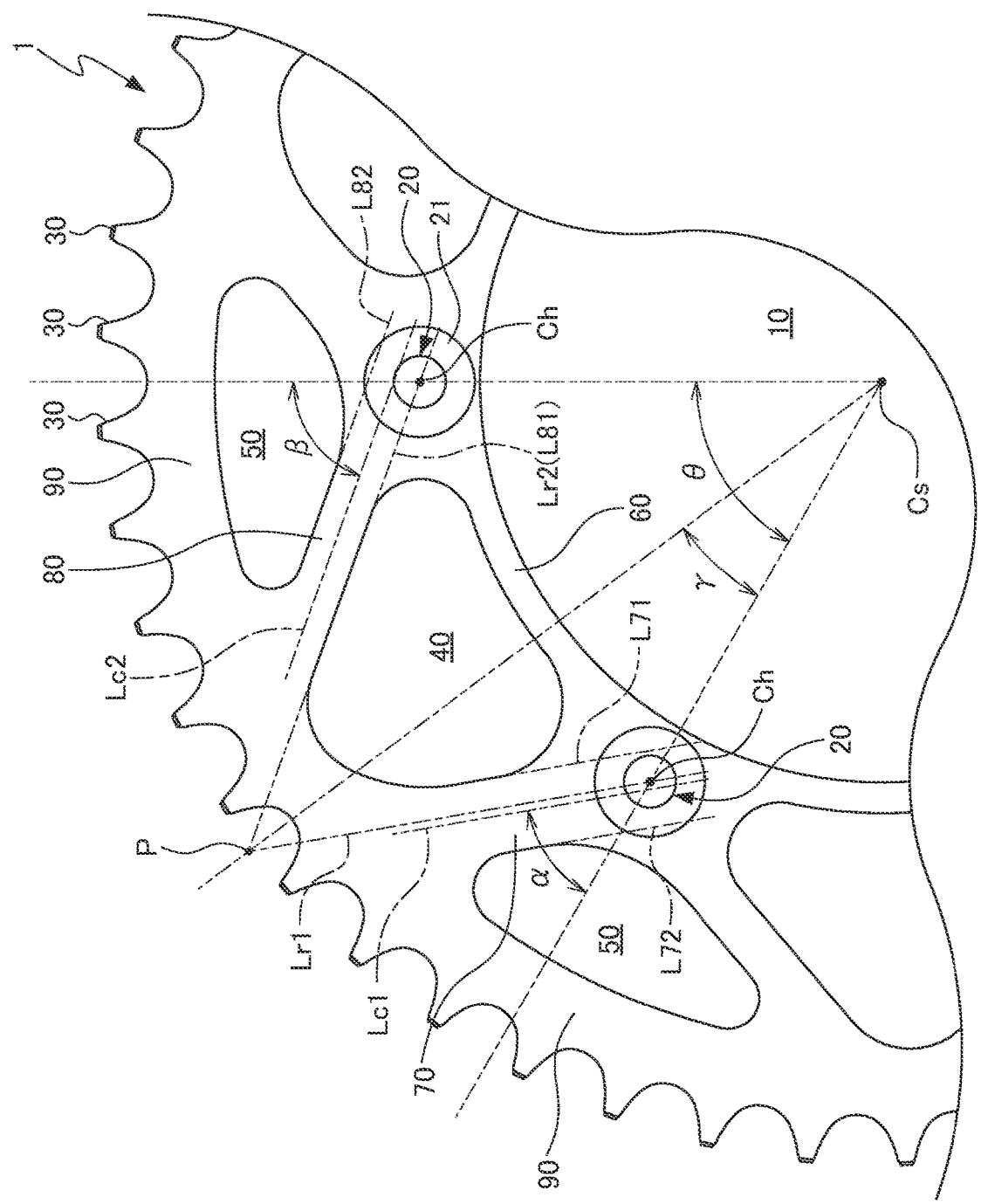
FIG. 2 is a partial enlarged view illustrating the details of the shape of the sprocket of FIG. 1.

Embodiments of the present invention will be described below with reference to the drawings. FIG. 1 is a planar view (seen in the direction of a rotational axis) that illustrates a sprocket 1 according to an embodiment of the present invention. FIG. 2 is a partial planer view illustrating the details of the shape of the sprocket 1, on an enlarged scale.

The sprocket 1 illustrated in FIG. 1 is a driven sprocket that is driven by a chain (not shown) to thereby rotationally drive a rotary shaft (not shown) fixed to the sprocket 1. The sprocket 1 rotates counterclockwise. Specifically, the sprocket 1 is driven at its outer periphery by the chain, and transmits torque acting in the counterclockwise direction.

The sprocket 1 has a substantial disk shape, and includes a central opening 10, a plurality of mounting holes 20, a plurality of sprocket teeth 30, a plurality of first openings 40, and a plurality of second openings 50. When viewed from the center of rotation Cs of the sprocket 1, the first openings 40 and the second openings 50 are alternately arranged in the circumferential direction.

The sprocket 1 includes a connecting frame 60 that is defined between the central opening 10 and the first openings 40 and connects sites where the mounting holes 20 are formed together. First crossbars 70 and second crossbars 80 are defined between the second openings 50 and the first openings 40. In each first crossbar 70, a driving force and a load reaction force act toward each other, whereas in each second crossbar 80, a driving force and a load reaction force act away from each other. An outer peripheral frame 90 that supports the sprocket teeth 30 is defined radially outward of the mounting holes 20. Note that "a driving force and a load reaction force act toward each other" means that the driving force and the load reaction force applied to a crossbar together act in a compression direction, and "a driving force and a load reaction force act away from each other" means that the driving force and the load reaction force applied to a crossbar together act in a tensile direction.

In the sprocket 1, the first crossbars 70 mainly transmit torque, and the second crossbars 80 retain an inclination angle of the first crossbars 70 to suppress stress concentration that can be caused by deformation of the first crossbars 70. In a driven sprocket, the first crossbar 70 extends with an inclination from one mounting hole 20 toward the outer periphery and backward in the rotation direction, and the second crossbar 80 extends with an inclination from one mounting hole 20 toward the outer periphery and forward in the rotation direction. In the case of a drive sprocket, the rotation direction is opposite.

The central opening 10 is formed at the center of the sprocket 1, and defines a space in which the rotary shaft is disposed. The central opening 10 also contributes to weight reduction of the sprocket 1. The size of the central opening 10 may be determined depending on required specifications.

The mounting holes 20 are formed in a vicinity of the central opening 10 and arranged at equal intervals in the circumferential direction. The mounting holes 20 allow insertion of bolts for mounting the sprocket 1 to a hub (not shown) fixed to the rotary shaft. The distance between each mounting hole 20 and the central opening 10 may be set to a distance with which a minimum area required for fastening the bolts is ensured. An auxiliary structure such as a counterbore 21 may be formed outside the mounting hole 20 for fastening the bolt. The size, number, radial position, and the like of the mounting holes 20 can be determined depending on required specifications.

The sprocket teeth 30 have a predetermined shape and are formed on the outer periphery of the sprocket 1 at a predetermined pitch so as to mesh with the chain. The shape and number of sprocket teeth 30 may be determined depending on required specifications. Therefore, the outer diameter of the sprocket 1 can be determined depending on the specifications required for the sprocket teeth 30.

Each first opening 40 has a substantially triangular shape, specifically, a triangular shape having chamfered corners in the present embodiment. Two of the corners of the first opening 40 respectively face the mounting holes 20, and the remaining one corner of the first opening 40 is located toward the outer periphery and faces the sprocket teeth 30. The "substantially triangular shape" refers to a shape having three sides with a relatively small curvature and three corners with a relatively large curvature, and more specifically, a shape having three corner portions each defined as such a region that when points are set on the outline of the region so that adjacent ones thereof form an angle of 30° with the center of gravity, the tangent lines to the outline at the points successively have an angular difference of 10° or more. In other words, each of the sides of the first opening 40 may be a curve having a smaller curvature than the corner portions, and each of the corners of the first opening 40 may be chamfered into a shape that is bent stepwise to locally have a large curvature. In particular, for each first opening 40, it is preferable that the side connecting the two corners facing the mounting holes 20 has an arc shape concentric with the central opening 10 so that the connecting frame 60 has a substantially constant width. On the other hand, it is preferable that the remaining two sides of the first opening 40 are at least partially linear in order to ensure a strength of the first crossbar 70 and a strength of the second crossbar 80 while allowing the first opening 40 to have a large area. A description that a corner "faces" a mounting hole means that the corner portion is closest to the mounting hole.

Each second openings 50 have a substantially triangular shape. One of the corners of the second opening 50 faces the mounting hole 20, and the remaining two corners of the second opening 50 are located toward the outer periphery and face the sprocket teeth 30. Each of the sides of the second opening 50 may also be a curve, and in particular, the side connecting the two corners located toward the outer periphery preferably has an arc shape concentric with the central opening 10 so that the outer peripheral frame 90 supporting the sprocket teeth 30 and having a constant width is defined. On the other hand, it is preferable that the remaining two sides of the second opening 50 are at least partially straight and parallel to the side edges of the first crossbar 70 and the second crossbar 80 that are adjacent to the first openings 40 in order to ensure the strength of the first crossbar 70 and that of the second crossbar 80 while allowing the second opening 50 to have a large area.

Preferably, a minimum width of the first crossbar 70 is preferably larger than a minimum width of the second crossbar 80. In other words, it is preferable that the first crossbars 70 that mainly transmit torque have a relatively large width to ensure a suitable strength, and the second crossbars 80 that assist the first crossbars 70 have a relatively small width in order to reduce the weight.

It is preferable that for the minimum-width site of each first crossbar 70, a tangent line L71 to a side edge adjacent to the first opening 40 is positioned toward the center of rotation Cs relative to the mounting hole 20. It is also preferable that for the minimum-width site of each first crossbar 70, a tangent line L72 to a side edge adjacent to the second opening 50 is positioned toward the outer periphery relative to the mounting hole 20. In other words, it is preferable that the minimum width of the first crossbar 70 is larger than the diameter of the mounting hole 20 having a size allowing insertion of the bolt with a cross-sectional area required for torque to be transmitted.

Furthermore, it is more preferable that a centerline Lc1 of the minimum-width site of each first crossbar 70 passes through the mounting hole 20. The centerline Lc1 is a perpendicular bisector of a line segment indicating the shortest distance between the first opening 40 and the second opening 50 (a line segment connecting the closest points). Due to this configuration, the torque that is transmitted from the chain via the first crossbars 70 can be efficiently transmitted to the hub to which the sprocket 1 is mounted, by means of the mounting holes 20.

It is preferable that for the minimum-width site of each second crossbar 80, a tangent line L81 to a side edge adjacent to the first opening 40 passes through the mounting hole 20, and more preferably passes through the center Ch of the mounting hole 20. It is also preferable that for the minimum-width site of each second crossbar 80, a tangent line L82 to a side edge adjacent to the second opening 50 is positioned toward the outer periphery relative to the mounting hole 20.

Furthermore, it is more preferable that a centerline Lc2 of the minimum-width site of each second crossbar 80 passes through the mounting hole 20. This configuration makes it possible to increase the strength of the sprocket 1 and suppress deformation of the first crossbars 70 while reducing the weight of the sprocket 1 as much as possible. In particular, the design in which the tangent line L81 to the side edge of the minimum-width site of the second crossbar 80 adjacent to the first opening 40 passes through the mounting hole 20 leads to an increase in the size of the first opening 40, thereby further effectively contributing to reduction of weight of the sprocket 1.

An inclination angle α at which the centerline Lc1 of the first crossbar 70 is inclined with respect to a radial direction of the sprocket 1 is preferably smaller than an inclination angle β at which the centerline Lc2 of the second crossbar 80 is inclined with respect to a radial direction of the sprocket 1. This configuration in which the inclination angle α of the first crossbar 70 is smaller than the inclination angle β of the second crossbar 80 results in that the first crossbar 70 is smaller in length than the second crossbar 80, and accordingly, leads to a relatively small increase in the area of the sprocket 1 and hence the mass of the sprocket 1 in a case where the width of the first crossbar 70 is increased for improvement of the strength.

Specifically, the lower limit of the inclination angle α of the centerline Lc1 of the first crossbar 70 is preferably 40°, and more preferably 45°. On the other hand, the upper limit of the inclination angle α of the centerline Lc1 of the first crossbar 70 is preferably 60°, and more preferably 55°.

Setting the inclination angle α of the first crossbar 70 within such a range makes it possible to reduce a bending stress and a shear stress that act on the first crossbar 70 to relatively low levels in a typical motorcycle, thereby enabling relatively efficient transmission of the torque acting on the sprocket 1.

A first reference line Lr1 that passes through the center Ch of the mounting hole 20 and is parallel to the centerline Lc1 of the first crossbar 70 intersects at an intersection point P with a second reference line Lr2 that passes through the center Ch of another mounting hole 20 and is parallel to the centerline Lc2 of the second crossbar 80, and the intersection point P is preferably positioned in a vicinity of an addendum circle of the sprocket teeth 30. Note that "vicinity of an addendum circle" refers to an area radially extending from the addendum circle by a distance equal to or less than a tooth depth, preferably by a distance equal to or less than an addendum. This configuration makes it possible to accurately divide a force transmitted from the chain into a component that transmits torque along the first crossbar 70 and a component that is orthogonal to the first crossbar 70 and to be absorbed by the second crossbar 80, thereby enabling efficient transmission of the torque.

With respect to the center of rotation Cs of the sprocket 1 as a reference, an angle γ is formed by the intersection point P of the first reference line Lr1 and the second reference line Lr2 and the center Ch of one mounting hole 20 adjacent to the first crossbar 70, and an angle θ is formed by two mounting holes 20 adjacent to each other. A ratio of the angle γ to the angle θ (i.e., γ/θ: hereinafter, referred to as the crossbar angle ratio) is preferably 0.20, and more preferably 0.30. On the other hand, the upper limit of the crossbar angle ratio is preferably 0.45, and more preferably 0.40. Setting the crossbar angle ratio equal to or greater than the lower limit described above makes it possible to reduce the maximum stress acting on the first crossbar 70 to a relatively low level. Setting the crossbar angle ratio equal to or lower than the upper limit described above makes it possible to prevent or reduce an increase in the total length of the first crossbar 70 and the second crossbar 80, and to make the first crossbar 70 and the second crossbar 80 have small areas, thereby enabling reduction of the weight of the sprocket 1.

As described above, the sprocket 1 is provided with the first openings 40 and the second openings 50 that define the first crossbars 70 and the second crossbars 80, and each first crossbar 70 extends from one mounting hole 20 while being inclined so that the driving force and the load reaction force act toward each other whereas each second crossbar 80 extends from one mounting hole 20 while being inclined so that the driving force and the load reaction force act away from each other. Due to this configuration, the sprocket 1 is relatively lightweight while being highly strong and capable of transmitting a larger torque.

The design of the sprocket 1 can be produced by a method, which is a non-limiting example, including a step of arranging the central opening 10, the mounting holes 20, and the sprocket teeth 30 based on required specifications, a step of drawing a circle defining an outer edge of the connecting portion 60 (the side of each first opening 40 connecting the two corners facing the mounting holes 20) and a circle defining an inner edge of the outer peripheral frame 90 (the side of each second opening 50 connecting the two corners adjacent to the outer periphery), a step of setting the first reference line Lr1 and the second reference line Lr2, a step of determining, as straight lines respectively parallel to the first reference line Lr1 and the second reference line Lr2, two sides of each first opening 40 and two sides of each second opening 50 that define the side edges of the first crossbar 70 and the side edges of the second crossbar 80, and a step of chamfering the corners of the first opening 40 and the second opening 50.

The step of setting the first reference line Lr1 and the second reference line Lr2 may be performed in the following manner. The first reference line Lr1 passing through the center Ch of the mounting hole 20 is drawn, the intersection point P is set on the first reference line Lr1 in the vicinity of the addendum circle of the sprocket teeth 30, and then the second reference line Lr2 is drawn to connect the intersection point P and the adjacent mounting hole 20. At this time, the position of the intersection point P may be the intersection point of the first reference line Lr1 with the addendum circle, or alternatively, an intersection point on a virtual circle having an easy-to-understand diameter, instead of the addendum circle the diameter of which is unlikely to have a value without fractions.

While the sprocket 1 according to one embodiment of the present invention has been described in the foregoing, the configuration and effects of the sprocket according to the present invention are not limited to those described above. For example, the first opening and the second opening of the sprocket according to the present invention may be formed into the shape of a substantial isosceles triangle to define the first crossbar and the second crossbar that are symmetrical in the rotation direction. Furthermore, the sides and chamfers of the first opening and the second opening of the sprocket according to the present invention may each have a shape varying continuously or stepwise.

EXAMPLES

Hereinafter, the present invention will be described in more detail with reference to examples. Note that the present invention is not limited to the following examples.

(Model No. 1)

Figure 3:
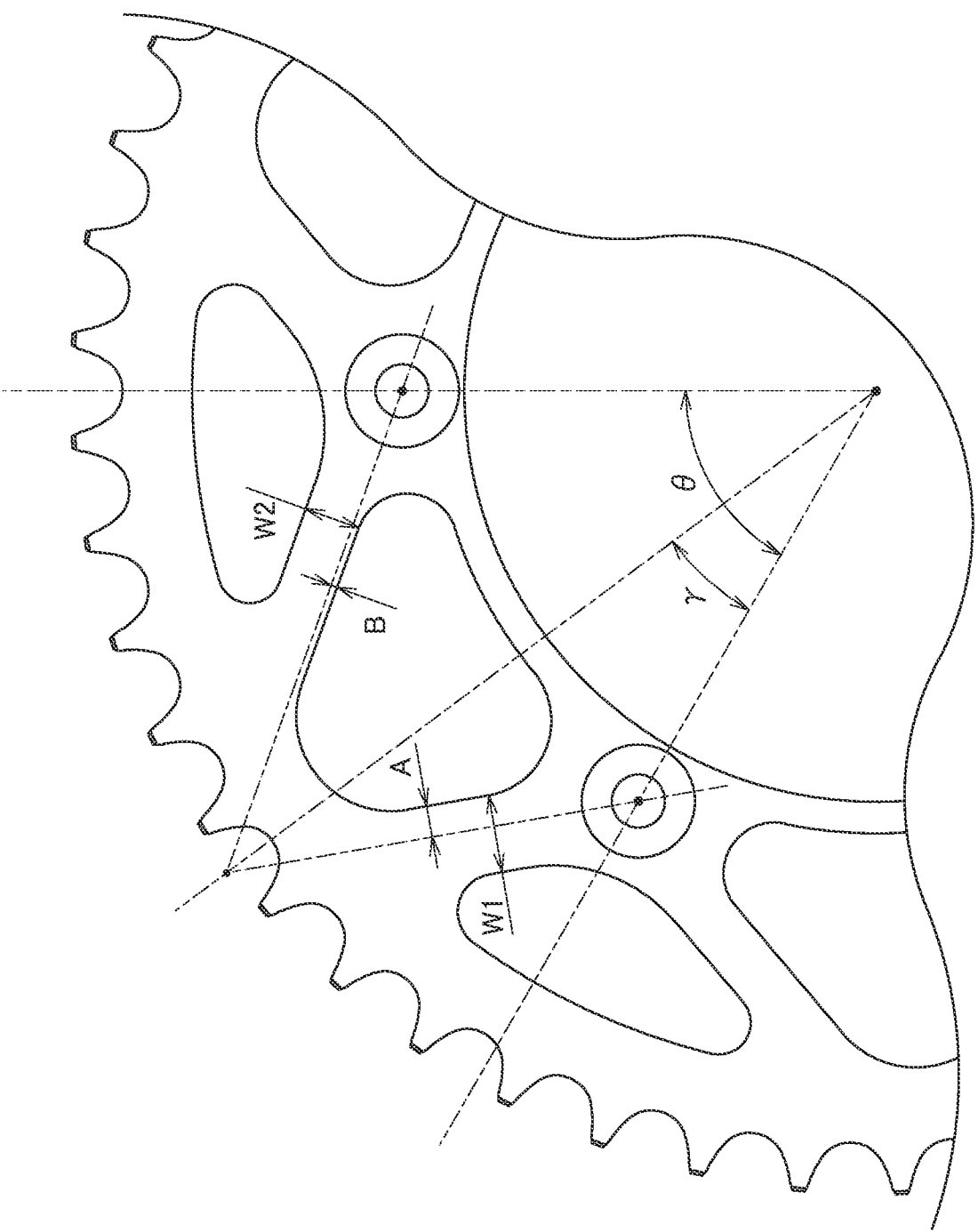
FIG. 3 is a diagram illustrating a shape of a model of a sprocket according to an example.

As Model No. 1, the sprocket shown in FIG. 3 was modeled according to the above embodiment. In the sprocket of Model No. 1, the radius of the central opening was 65 mm, the diameter of the mounting hole was 8.5 mm, the radius of the pitch circle of the mounting holes was 75 mm, the number of the mounting holes was 6, the diameter of the addendum circle was 127 mm, and the radius of the dedendum circle was 119 mm. The radius of the outer edge of the connecting frame 60 was 70 mm, and the radius of the inner edge of the outer peripheral frame 90 was 108 mm. The first reference line inclined at an angle of 60° with respect to a radial direction was drawn from the center of one mounting hole, and a second reference line was drawn to connect an intersection point (with a crossbar angle ratio γ/θ of 0.39) of the first reference line with a virtual circle having a radius of 128 mm and the center of the adjacent mounting hole. In Model No. 1, the width of the first crossbar was set to 12 mm, the width of the second crossbar was set to 8 mm, a straight line offset by 5.0 mm from the first reference line toward the center of rotation was set as the side edge of the first crossbar adjacent to the first opening, and the second reference line (i.e., a straight line with an offset amount of 0 mm toward the center of rotation) was set as a side edge of the second crossbar adjacent to the first opening.

(Model Nos. 2 to 17)

Model Nos. 2 to 5 are different from Model No. 1 in the crossbar angle ratio. Model Nos. 6 to 9 are different from Model No. 1 in the width W1 of the first crossbar (an offset amount A by which the side edge adjacent to the first opening is offset from the first reference line toward the center of rotation). Model Nos. 10 to 13 are different from Model No. 1 in the width W2 of the second crossbar (an offset amount B by which the side edge adjacent to the second opening is offset from the second reference line). Model Nos. 14 to 17 are different from Model No. 1 in the offset amount B by which the side edge of the second crossbar adjacent to the second opening is offset from the second reference line (but are the same as Model No. 1 in the width of the second crossbar).

For each of Model Nos. 1 to 17, the maximum stress was calculated by computer simulation, and the weight (volume) of the respective sprocket was calculated. The results are shown in Table 1 below, in which the values of Model No. 1 are defined as 100%.

As can be seen, setting, within a predetermined range, the ratio between the angles formed with respect to the center of rotation as the reference, that is, the ratio of the angle formed by the intersection point of the first reference line with the second reference line and the center of one mounting hole adjacent to the first crossbar to the angle formed between two adjacent mounting holes makes it possible to reduce the maximum stress to a low level and increase a strength relating to torque transmission, while reducing an increase in weight. In order to efficiently reduce the maximum stress without increasing the weight, it is preferable that the centerline of the first crossbar passes through the vicinity of the center of the mounting hole, and the side edge of the second crossbar adjacent to the first opening is positioned in proximity to the center of the mounting hole.

EXPLANATION OF REFERENCE NUMERALS

1: Sprocket
10: Central opening
20: Mounting hole
30: Sprocket teeth
40: First opening
50: Second opening
60: Connecting frame
70: First crossbar
80: Second crossbar
90: Outer peripheral frame
Ch: Center of mounting hole
Cs: Center of rotation
L71, L72, L81, L82: Tangent line
Lc1: Centerline of first crossbar
Lc2: Centerline of second crossbar
Lr1: First reference line
Lr2: Second reference line
P: Intersection point of first reference line with second reference line.

TABLE 1

| Model No. | Crossbar Angle Ratio γ/θ (°) | Width of First Crossbar W1 (mm) | Position of First Crossbar A (mm) | Width of Second Crossbar W2 (mm) | Position of Second Crossbar B (mm) | Maximum Stress (%) | Weight (%) |
|---|---|---|---|---|---|---|---|
| 1 | 0.39 | 12 | 5 | 8 | 0 | 100 | 100 |
| 2 | 0.22 | 12 | 5 | 8 | 0 | 90 | 103 |
| 3 | 0.30 | 12 | 5 | 8 | 0 | 103 | 102 |
| 4 | 0.49 | 12 | 5 | 8 | 0 | 115 | 101 |
| 5 | 0.61 | 12 | 5 | 8 | 0 | 124 | 103 |
| 6 | 0.39 | 8 | 1 | 8 | 0 | 142 | 94 |
| 7 | 0.39 | 10 | 3 | 8 | 0 | 117 | 97 |
| 8 | 0.39 | 14 | 7 | 8 | 0 | 94 | 103 |
| 9 | 0.39 | 16 | 9 | 8 | 0 | 89 | 106 |
| 10 | 0.39 | 12 | 5 | 6 | 0 | 118 | 97 |
| 11 | 0.39 | 12 | 5 | 7 | 0 | 107 | 99 |
| 12 | 0.39 | 12 | 5 | 9 | 0 | 97 | 102 |
| 13 | 0.39 | 12 | 5 | 10 | 0 | 95 | 103 |
| 14 | 0.39 | 12 | −6 | 8 | 0 | 116 | 100 |
| 15 | 0.39 | 12 | −3 | 8 | 0 | 102 | 100 |
| 16 | 0.39 | 12 | 3 | 8 | 0 | 101 | 100 |
| 17 | 0.39 | 12 | 6 | 8 | 0 | 107 | 100 |
| 18 | 0.39 | 12 | 5 | 8 | −4 | 108 | 100 |
| 19 | 0.39 | 12 | 5 | 8 | −2 | 104 | 100 |
| 20 | 0.39 | 12 | 5 | 8 | 2 | 101 | 100 |
| 21 | 0.39 | 12 | 5 | 8 | 4 | 107 | 100 |

The invention claimed is:

1. A sprocket comprising:
mounting holes arranged at equal intervals in a circumferential direction:
a plurality of sprocket teeth provided on an outer periphery:
first openings each having a substantially triangular shape two corners of which respectively face the mounting holes and a remaining one corner of which is located toward the outer periphery; and
second openings each having a substantially triangular shape one corner of which faces the mounting hole and remaining two corners of which are located toward the outer periphery,
the first and second openings defining therebetween first crossbars where a driving force and a load reaction force act toward each other and second crossbars where a driving force and a load reaction force act away from each other;
wherein an inclination angle at which a centerline of a minimum-width site of each first crossbar is inclined with respect to a radial direction is smaller than an inclination angle at which a centerline of a minimum-width site of each second crossbar is inclined with respect to a radial direction.

2. A sprocket comprising:
mounting holes arranged at equal intervals in a circumferential direction:
a plurality of sprocket teeth provided on an outer periphery:
first openings each having a substantially triangular shape two corners of which respectively face the mounting holes and a remaining one corner of which is located toward the outer periphery; and
second openings each having a substantially triangular shape one corner of which faces the mounting hole and remaining two corners of which are located toward the outer periphery,
the first and second openings defining therebetween first crossbars where a driving force and a load reaction force act toward each other and second crossbars where a driving force and a load reaction force act away from each other:
wherein a first reference line passes through a center of one of the mounting holes and is parallel to a centerline of a minimum-width site of each first crossbar, and a second reference line passes through a center of one of the mounting holes and is parallel to a centerline of a minimum-width site of each second crossbar, and
wherein an intersection point of the first reference line with the second reference line is positioned in a vicinity of an addendum circle of the sprocket teeth:
wherein with respect to a center of rotation as a reference, an angle is formed by the intersection point and one of the mounting holes that is adjacent to the first crossbar, and an other angle is formed between adjacent two of the mounting holes, and
wherein a ratio of the angle to the other angle is 0.20 or more and 0.45 or less.

3. A sprocket comprising:
mounting holes arranged at equal intervals in a circumferential direction:
a plurality of sprocket teeth provided on an outer periphery:
first openings each having a substantially triangular shape two corners of which respectively face the mounting holes and a remaining one corner of which is located toward the outer periphery; and
second openings each having a substantially triangular shape one corner of which faces the mounting hole and remaining two corners of which are located toward the outer periphery,
the first and second openings defining therebetween first crossbars where a driving force and a load reaction force act toward each other and second crossbars where a driving force and a load reaction force act away from each other,
wherein for a minimum-width site of each first crossbar, a tangent line to a side edge adjacent to the first opening passes through a location toward a center of rotation relative to one of the mounting holes, and
a tangent line to a side edge adjacent to the second opening passes through a location toward the outer periphery relative to the one of the mounting holes, and
wherein for a minimum-width site of each second crossbar, a tangent line to a side edge adjacent to the first opening passes through one of the mounting holes, and
a tangent line to a side edge adjacent to the second opening passes through a location toward the outer periphery relative to the one of the mounting holes.

* * * * *